(12) United States Patent
Stinson (10) Patent No.: US 10,232,397 B2
(45) Date of Patent: Mar. 19, 2019

(54) APPARATUS FOR MASKING A NUT PLATE DURING PAINTING OF AN AIRCRAFT PART CONTAINING THE NUT PLATE

(71) Applicant: Corsaire Components Ltd, Thresfield (GB)

(72) Inventor: Dennis Dean Stinson, Thresfield (GB)

(73) Assignee: Corsaire Components Ltd, Threshfield (GB)

( * ) Notice: Subject to any disclaimer, the term of this patent is extended or adjusted under 35 U.S.C. 154(b) by 430 days.

(21) Appl. No.: 14/925,540

(22) Filed: Oct. 28, 2015

(65) Prior Publication Data

US 2016/0136673 A1 May 19, 2016

(30) Foreign Application Priority Data

Nov. 18, 2014 (GB) .................................. 1420508.2

(51) Int. Cl.
 *B05B 12/26* (2018.01)
 *F16B 37/04* (2006.01)

(52) U.S. Cl.
 CPC ............ *B05B 12/26* (2018.02); *F16B 37/045* (2013.01)

(58) Field of Classification Search
 None
 See application file for complete search history.

(56) References Cited

U.S. PATENT DOCUMENTS

| 3,718,068 A | * | 2/1973 | Passer ..................... F16B 15/02 411/38 |
| 4,762,451 A | | 8/1988 | Collins | |
| 5,013,391 A | * | 5/1991 | Hutter, III ......... B05C 17/00503 156/578 |
| 2003/0118419 A1 | * | 6/2003 | Easterbrook ............. B21J 15/02 411/1 |
| 2011/0150599 A1 | * | 6/2011 | Bakken .................. F16B 17/006 411/183 |
| 2017/0197733 A1 | | 7/2017 | Stinson | |

FOREIGN PATENT DOCUMENTS

| GB | 26532444 A | 5/2016 |
| JP | 2001353457 | 12/2001 |
| JP | 2009072869 | 4/2009 |
| JP | 2009293053 A | 12/2009 |

OTHER PUBLICATIONS

International Search Report for GB1420508.*

* cited by examiner

*Primary Examiner* — Charles Capozzi
(74) *Attorney, Agent, or Firm* — Iandiorio Teska & Coleman, LLP (57) ABSTRACT

Apparatus (42) for masking a nut plate (4) during painting of an aircraft part (6) containing the nut plate (4), comprising:
 (i) a masking formation (8) which is made of a rigid plastics material;
 (ii) a bore (10) which extends axially through the masking formation (8); and
 (iii) a mandrel (12) which is made of a flexible material and which extends through the bore (10) and projects beyond the masking formation (8),
and the apparatus (42) being such that the masking formation (8) comprises a body portion (14), a masking portion (16), and a skirt portion (20); there are no supporting formations which extend between the body portion (14) and a face (30) of the masking portion (16) and which would act to provide unwanted masking of areas of parts of the aircraft being painted; and the body portion (14) and/or the masking portion (16) are provided with internal integral reinforcing.

9 Claims, 9 Drawing Sheets

FIG. 1

Prior Art

FIG. 2

Prior Art

FIG. 3

Prior Art

FIG. 4

Prior Art

FIG. 5

Prior Art

FIG. 6

Prior Art

APPARATUS FOR MASKING A NUT PLATE DURING PAINTING OF AN AIRCRAFT PART CONTAINING THE NUT PLATE

RELATED APPLICATIONS

This application claims benefit of and priority to UK Patent Application No. GB1420508.2 filed Nov. 18, 2014.

This invention relates to apparatus for masking a nut plate during painting of an aircraft part containing the nut plate.

Various parts of aircraft, for example parts of aircraft wings and bodies are secured together by devices known as nut plates. Usually the parts are secured together by a large number of the nut plates which are located around the periphery of parts to be secured together. Often there is a slight misalignment between a hole in a first part and a hole in a second part which is placed on top of the first part. To allow for this misalignment, the nut plates take the form of a T-nut having a part located in a channel. A clip which is like a circlip is located in a groove in the channel, and grips the part of the T-nut in the channel. The T-nut moves within the clip, and thus the T-nut is able to move back and forth in the channel as may be required to compensate for the misalignment. When the aircraft parts are painted, for example sprayed, paint tends to get on the nut plate and secure it in position. It is then necessary to break the nut plate free from the dried paint so that the nut plate can move as required for connection purposes.

The problem of paint drying on nut plates, and stopping them moving is substantial. An aircraft may have hundreds or thousands of the nut plates. The time taken to break the nut plates free from dried paint so that they can move as required is very substantial.

In order to meet the above mentioned problem, it is known to use masking apparatus comprising a masking formation which is made of a rigid plastics material, a bore which extends axially through the masking formation, and a mandrel which is made of a flexible material and which extends through the bore in the masking formation such as to project beyond the masking formation. The flexible material is a soft rubber material. The masking formation comprises a body portion, a masking portion which is positioned at one end of the body portion and which extends radially outwardly beyond the body portion, and a skirt portion which is formed at a periphery of the masking portion and which extends from a first face of the masking portion and away from the body. The mandrel comprises a first portion of a first diameter which locates in the bore, and second portion which is of a second and smaller diameter and which is for locating the apparatus during the painting. The body portion extends from a second face of the masking portion, and buttresses extend between the body portion and the second face of the masking portion. The buttresses support the masking portion and prevent it breaking during use.

In use of the above mentioned known apparatus, the soft rubber mandrel is inserted through a hole in a part of the aircraft. An operator then pulls on the mandrel to seat the masking portion over the hole. The mandrel stops paint getting in the hole. The masking formation covers the T-nut. After painting, the mandrel is pulled out of the hole. It is easy to pull the mandrel out of the hole because the mandrel comprises the flexible material.

The above mentioned known apparatus suffers from a problem in that it masks areas of the parts to be painted.

It is an aim of the present invention to obviate or reduce the above mentioned problem.

Accordingly, the present invention provides apparatus for masking a nut plate during painting of an aircraft part containing the nut plate, which apparatus comprises:
 (i) a masking formation which is made of a rigid plastics material;
 (ii) a bore which extends axially through the masking formation;
 (iii) a mandrel which is made of a flexible material and which extends through the bore in the masking formation such as to project beyond the masking formation,
and the apparatus being such that:
 (iv) the masking formation comprises a body portion, a masking portion which is positioned at one end of the body portion and which extends radially outwardly beyond the body portion, and a skirt portion which is positioned at a periphery of the masking portion and which extends from a first face of the masking portion and away from the body portion;
 (v) the mandrel has a first portion of a first diameter which locates in the bore, and a second portion which is of a second and smaller diameter than the first diameter and which is for locating the apparatus during the painting;
 (vi) the body portion extends from a second face of the masking portion;
 (vii) there are no supporting buttresses extending between the body portion and the second face of the masking portion, whereby the second face of the masking portion is free from supporting buttresses which would act to provide unwanted masking of areas of parts of the aircraft being painted;
 (viii) the body portion and/or the masking portion are such that they are provided with internal integral reinforcement that prevents the breaking of the masking portion during use of the apparatus, even although there are no supporting buttresses extending between the body portion and the masking portion; and
 (ix) the masking formation is a straight sided masking formation which is configured to fit inside a channel part of the nut plate and thereby to effect masking only in the inside of the channel part of the nut plate.

The apparatus of the present invention is based on the realisation that it is the buttresses in the known apparatus that cause the unwanted masking. The apparatus of the present invention is advantageous in that it uses internal integral reinforcing and thereby avoids the need to have external supporting formations such for example as buttresses, and which would cause unwanted masking during painting. Thus the parts are able to painted without the unwanted masking. Also, the apparatus of the present invention is able to be used without unwanted breaking of the masking portion, during the pushing and pulling of the apparatus that is required to break the apparatus free from the dried paint.

Preferably, the apparatus is one in which the internal integral reinforcing is an extra wall thickness.

The body portion may be in the form of a cylinder. Other shapes of the body portion may be employed. Where the body portion is a cylinder, then the cylinder will usually be circular in cross section. Other cross sectional shapes may however be employed so that, for example, the body portion may be hexagonal or octagonal in cross section.

The bore will usually be circular in cross section. Bores having other cross sectional shapes may however be employed.

The first and second portions of the mandrel may be of circular cross section. The first and second portions of the mandrel may be of other cross sectional shapes if desired.

The rigid plastics material may be, for example, a thermoplastics material. The rigid plastics material may be acrylonitrile butadiene styrene (ABS), nylon or ethylene. Other types of rigid plastics materials may be employed.

The flexible material is preferably rubber. The flexible material may alternatively be a flexible plastics material. When the flexible material is rubber, then the rubber is preferably a soft rubber.

An embodiment of the invention will now be described solely by way of example and with reference to the accompanying drawings in which.

Figure 1:
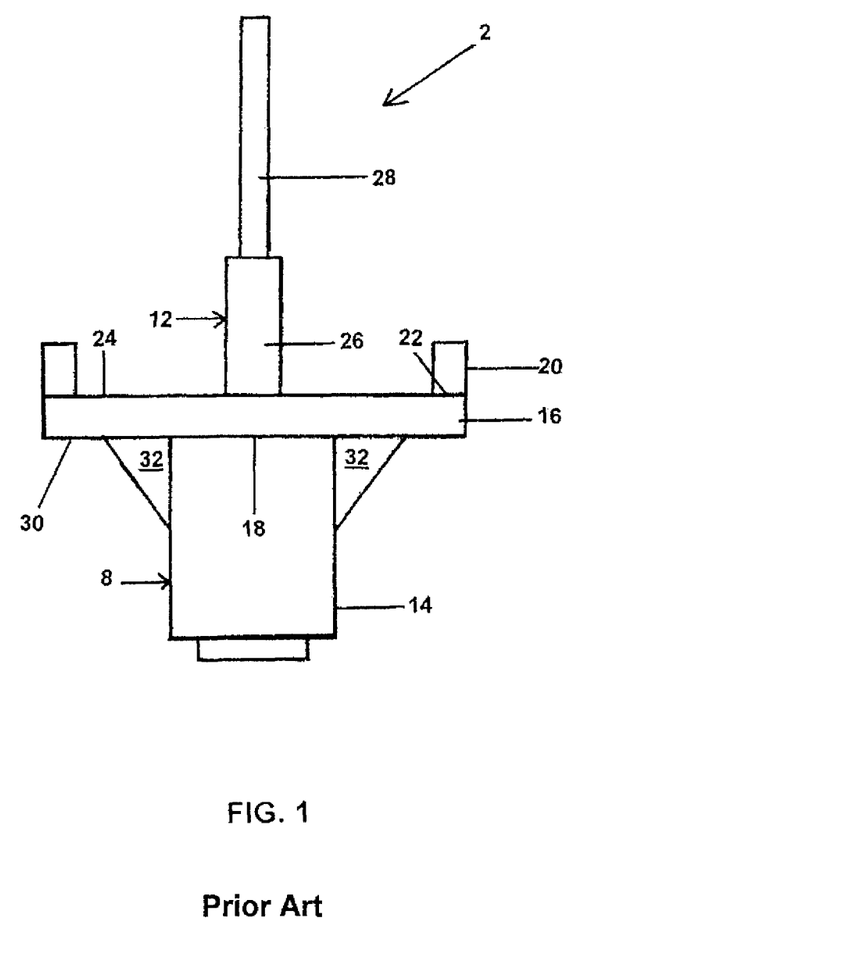
FIG. 1 shows known apparatus for masking a nut plate during painting of an aircraft part containing the nut plate.

Referring to FIG. 1, there is shown known apparatus 2 for masking a nut plate 4 during painting of an aircraft part 6 containing the nut plate 4. The apparatus 2 comprises a masking formation 8 which is made of a rigid plastics material. A bore 10 extends axially through the masking formation 8.

The apparatus 2 also comprises a mandrel 12 which is made of a flexible material and which extends through the bore 10 in the masking formation 8 such as to project beyond the masking formation 8 as shown.

Figure 2:
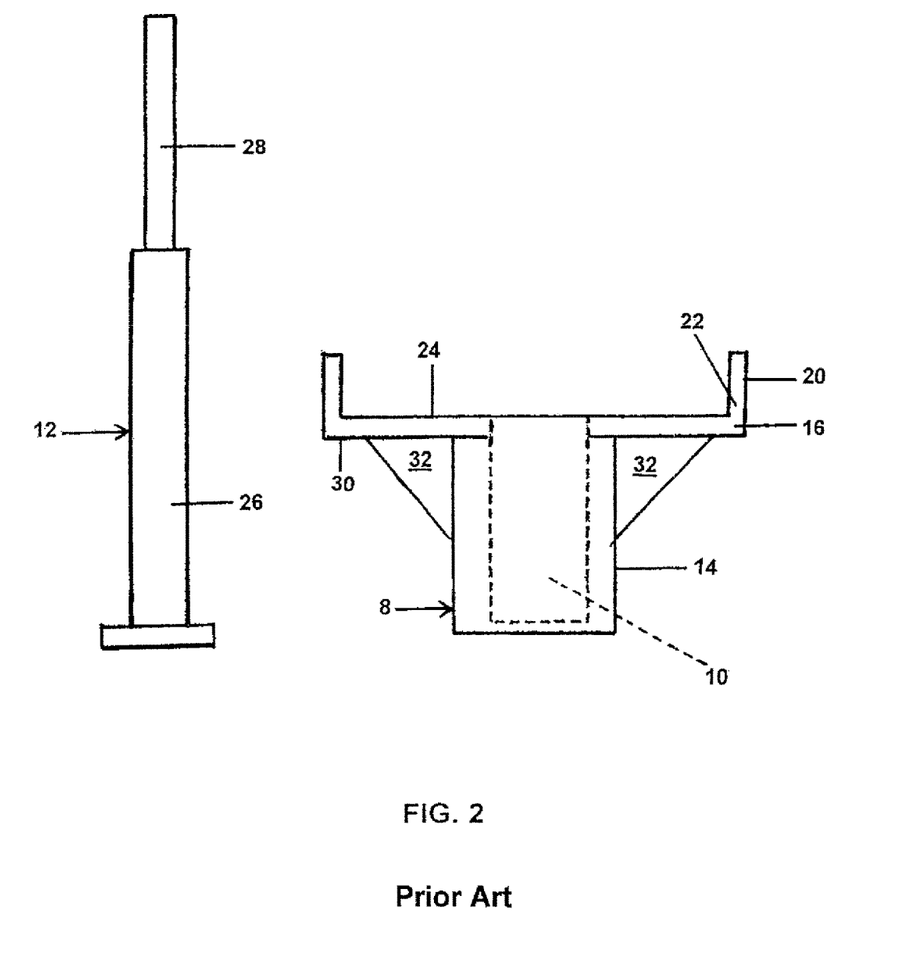
FIG. 2 is an exploded view of the known apparatus shown in FIG. 1.
Figure 3:
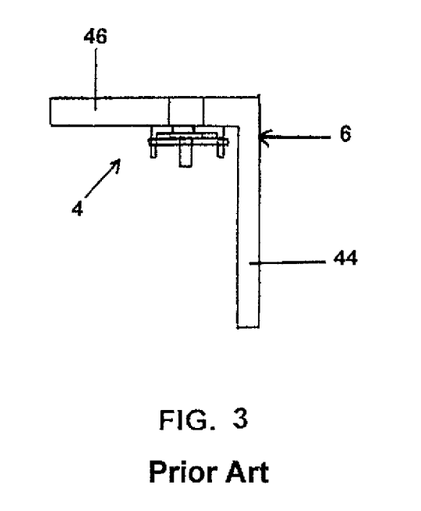
FIG. 3 is an end view of a right angled aircraft part containing a nut plate.

The apparatus 2 is such that the masking formation 8 comprises a body portion 14, a masking portion 16 which is positioned at one end 18 of the body portion 14 and which extends radially outwardly as shown beyond the body portion 14. The masking formation 8 further comprises a skirt portion 20 which is positioned at a periphery 22 of the masking portion 16 and which extends from a first face 24 of the masking portion 16 and parallel to the bore 10 and away from the body portion 14.

The mandrel 12 has a first portion 26 of a first diameter which locates in the bore 10, and a second portion 28 which is of a second and smaller diameter and which is for locating the apparatus 2 during the painting.

The body portion 14 extends from a second face 30 of the masking portion 16.

In order to support the masking portion 16 on the body portion 14, buttresses 32 are employed. There may be four of the buttresses 32 radially disposed around the body portion 14.

Figure 4:
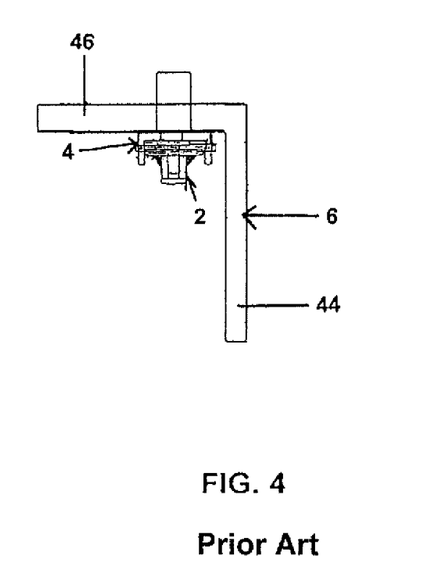
FIG. 4 is an end view like FIG. 3 and shows in simplified form the apparatus of FIG. 1 in position.
Figure 5:
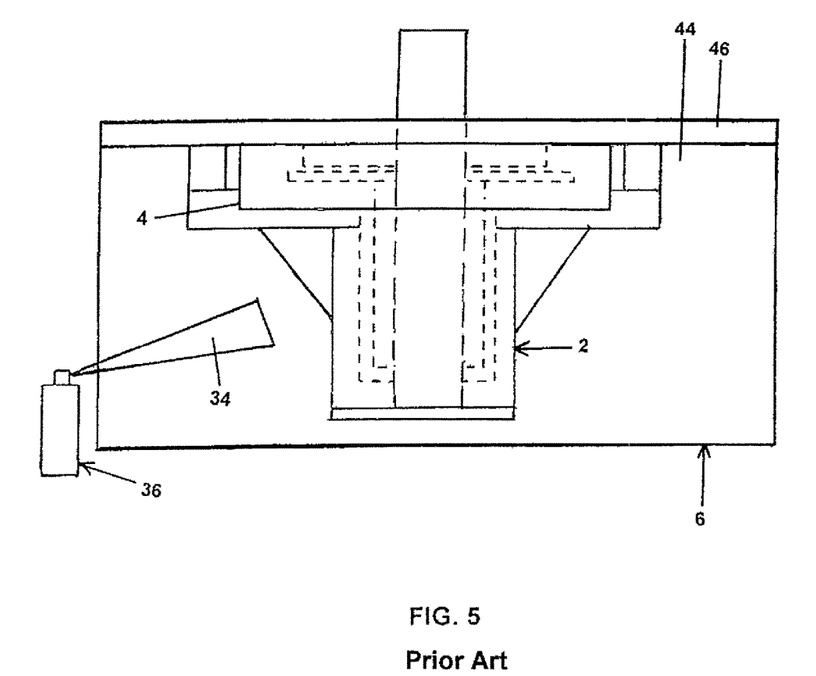
FIG. 5 is an enlarged front view of what is shown in FIG. 4 and illustrates painting of the aircraft part by spraying.
Figure 6:
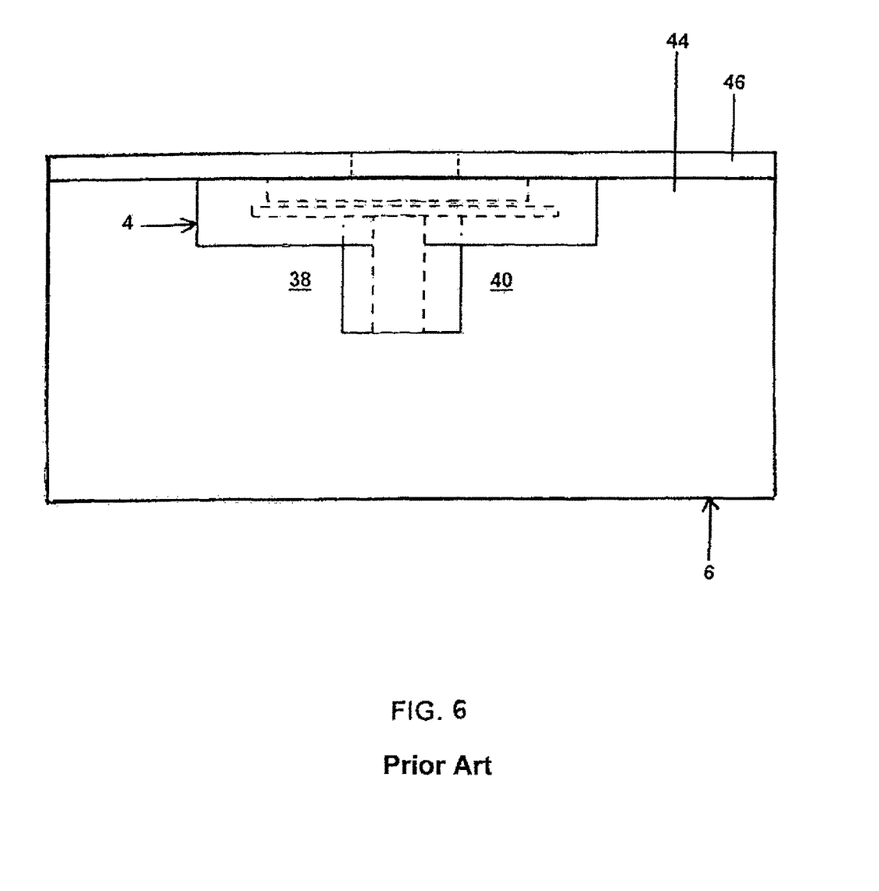
FIG. 6 is a view like FIG. 5, with the known apparatus removed, and showing non-painted areas caused by the known apparatus causing unwanted masking.
Figure 7:
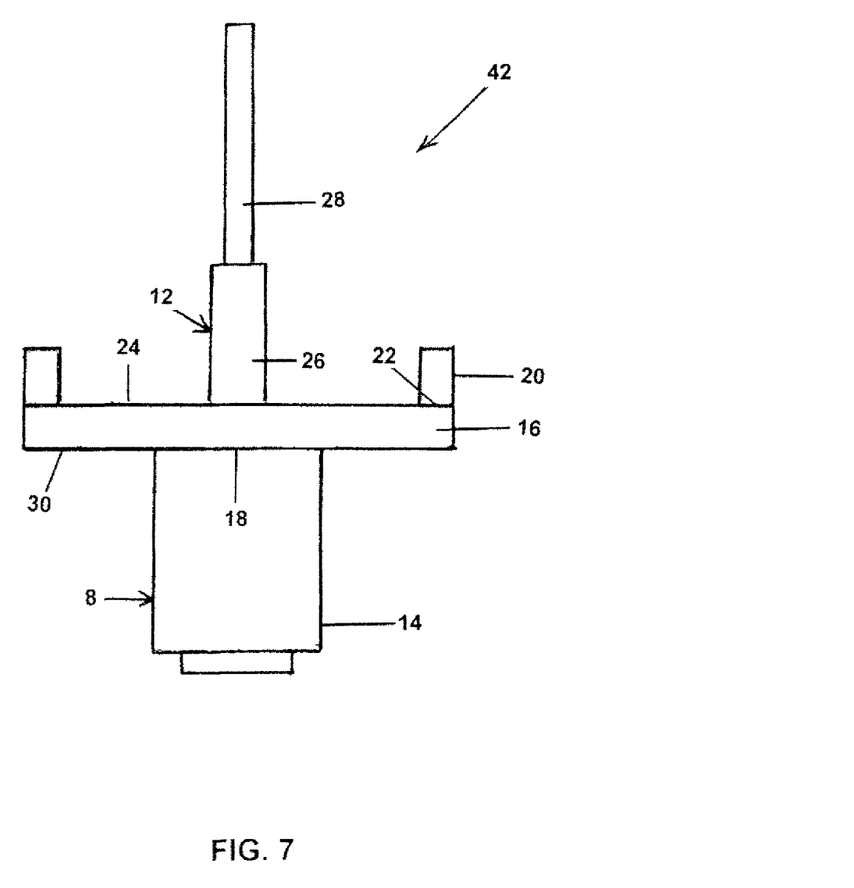
FIG. 7 is like FIG. 1 but shows apparatus of the present invention for masking a nut plate during painting of an aircraft part containing the nut plate.
Figure 8:
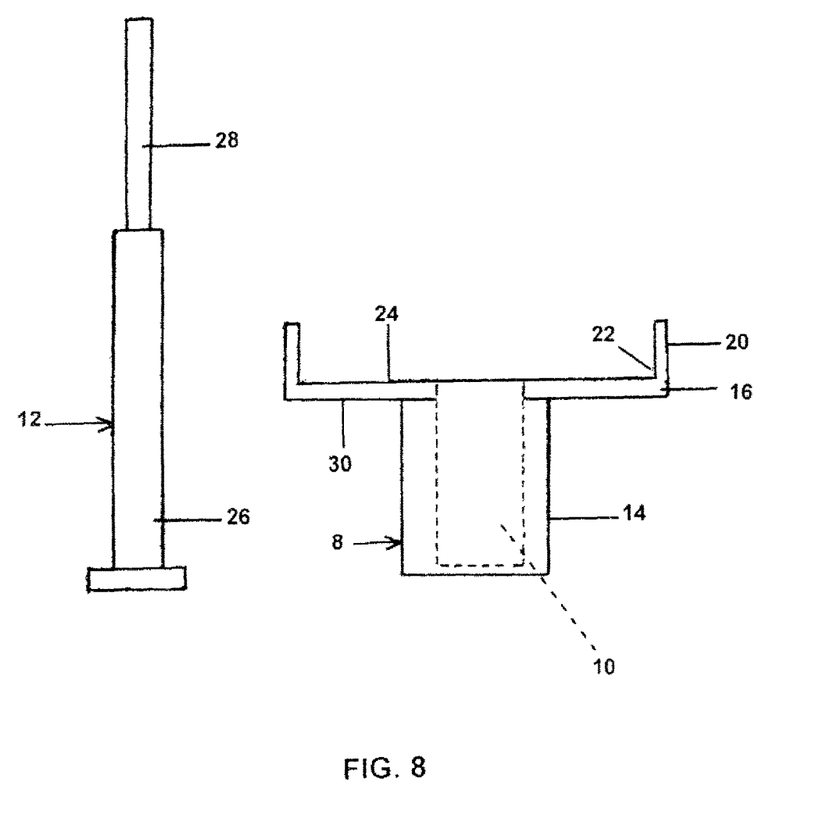
FIG. 8 is an exploded view like FIG. 2 but of the apparatus of the present invention shown in FIG. 7.
Figure 9:
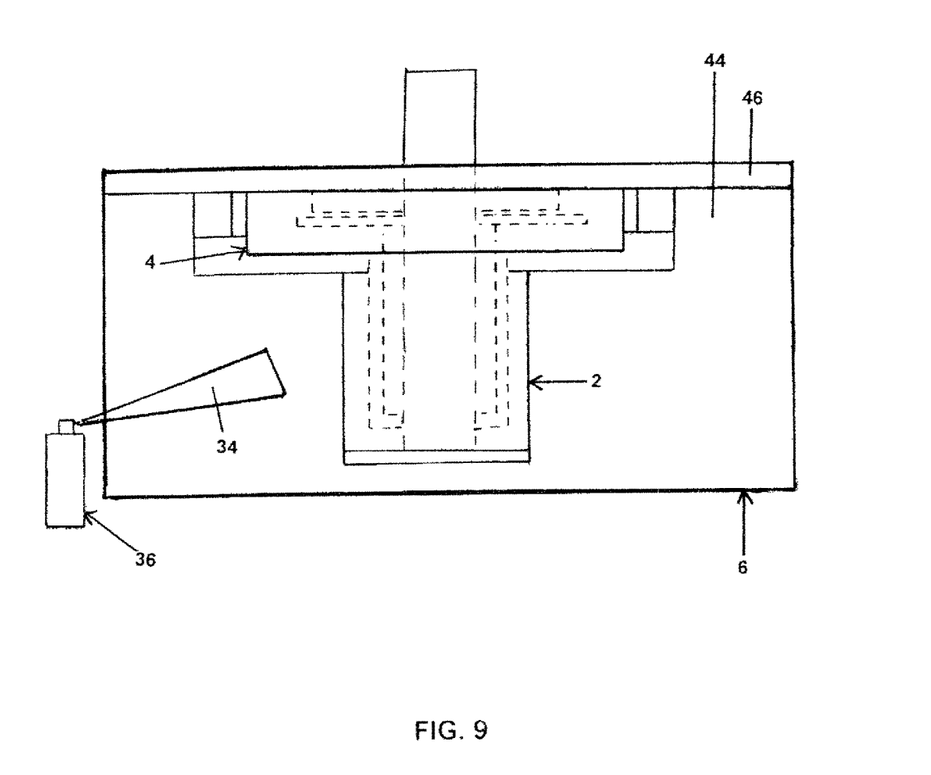
FIG. 9 is a view like FIG. 5 but shows the apparatus of the present invention shown in FIG. 5 in use during spraying.
Figure 10:
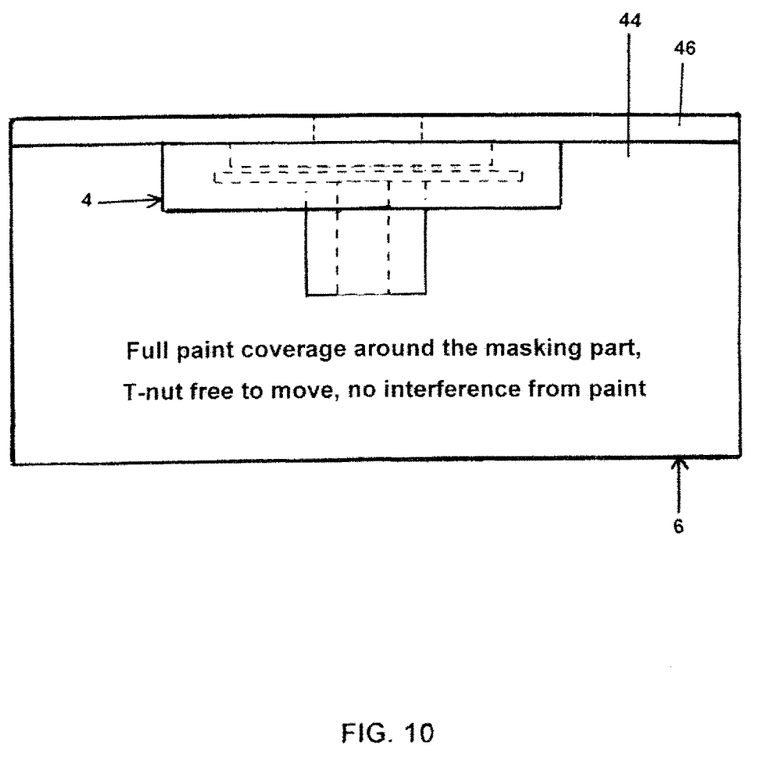
FIG. 10 is a view like FIG. 6 and shows how there has been no unwanted masking with the apparatus of the present invention as shown in FIG. 7 and used during spray painting as shown in FIG. 9.

As shown in FIGS. 4, 5 and 6, when the apparatus 2 is in use and the aircraft part 6 is being sprayed by a spray 34 from a container 36, the buttresses 32 cause unwanted masking of areas of the aircraft part 6 being sprayed. These masked areas are shown as non-painted areas 38, 40 in FIG. 6.

After use and when the paint has dried, the mandrel 12 is able to be pulled out of the bore 10. This is easily accomplished because the mandrel 12 is made of the flexible material so that it easily breaks away from any dried paint. The skirt portion 20 ensures that a good clean painted line is achieved. The mandrel 12 ensures that the bore 10 does not have any paint in it. However, when the apparatus 2 is removed, there will be the areas 38, 40 of the aircraft part 6 that have not been painted. Painting of these areas 38, 40 causes substantial work in view of the large number of aircraft parts having the nut plates 4. Leaving the areas 38, 40 unpainted may lead to premature degradation of these areas.

Referring now to FIGS. 7-10, there is shown apparatus 42 of the present invention. Similar parts as in the apparatus 2 have been given the same reference numerals for ease of comparison and understanding.

In the apparatus 42, it will be seen that there are no supporting formations in the form of the buttresses 32 extending between the body portion 14 and the second face 30 of the masking portion 16. Thus the second face 30 of the masking portion 16 is free from the buttresses 32. This means that the apparatus 42 is free from the buttresses 32 which would otherwise mask areas of the aircraft part 6 requiring to be painted.

Hitherto, the unwanted masking problem caused by the buttresses has not been realised, nor has it been realised how to overcome the problem. If the buttresses 32 were simply removed from the known apparatus 2, then the masking portion 16 would have a tendency to break during the pushing and pulling of the apparatus 2 that is required to pull the apparatus 2 away from the painted aircraft part 6 after the aircraft part 6 has been painted and the paint has dried. As will be appreciated, there may be various pushing and pulling forces, and even twisting forces. The simple removal of the buttresses 32 would thus generate another problem, i.e. that of the breaking of the masking portion 16. Changing the rigid plastics material used for the masking formation 8 to a metal would lead to manufacturing and cost problems.

The solution employed in the apparatus 42 of the present invention is firstly to ensure that there are no buttresses or similar supporting formations, and secondly to provide the body portion 14 and/or the masking portion 16 with the internal integral reinforcing material. The internal integral reinforcing material causes the body portion 14 and/or the masking portion 16 to be sufficiently thick that breaking of the masking portion 16 will not occur.

The use of the internal integral reinforcing material does not easily present itself as a solution to the problem of removing the buttresses 32. More specifically, the buttresses 32 are external and this is where reinforcing would normally be employed. It would not be thought possible to employ buttresses internally because such internal buttresses would engage the nut plate 4. Internal buttresses would thus stop operation of the location of the nut plate 4 and/or the clip in the groove.

The present invention is based on the realisation that there is sufficient internal space between the nut plate 4, the clip and the groove to enable an increase in the internal thickness of the body portion 14 and/or the masking portion 16. This increase in the internal thickness of the body portion 14 and/or the masking portion 16 is sufficient to provide the required strength to enable removal of the masking apparatus after the painting and without breaking of the masking portion 16. It is also at a position where it does not cause the unwanted masking.

As can be seen from FIGS. 7-10, the internal integral reinforcement is an extra wall thickness. The body portion 14 is a cylinder. The cylinder is of circular cross section. The masking portion 16 is a disc. The bore 10 is of circular cross section. The first and second portions 24, 26 of the mandrel 12 are of circular cross section.

The masking formation 8 is made of a rigid plastics material. More specifically, the rigid plastics material is a thermoplastics material such for example as ABS, nylon or ethylene. The mandrel 12 is made of a flexible material in the form of rubber. The rubber is a soft rubber.

It is to be appreciated that the embodiment of the invention described above with reference to the accompanying drawings has been given by way of example only and that modifications may be effected. Thus, for example, the aircraft part 6 has been shown as a right angled part having a first side 44 and a second side 46. Other types of aircraft parts that are secured together by nut plates may be used. Also, nut plates 4 of various designs may be used. Individual components shown in the drawings are not limited to use in their drawings and they may be used in other drawings and in all aspects of the invention.

The invention claimed is:

1. Apparatus for masking a nut plate during painting of an aircraft part containing the nut plate, which apparatus comprises:
   (i) a masking formation which is made of a rigid plastics material;
   (ii) a bore which extends axially through the masking formation;
   (iii) a mandrel which is made of a flexible material and which extends through the bore in the masking formation such as to project beyond the masking formation, and the apparatus being such that:
   (iv) the masking formation comprises a body portion, a masking portion which is positioned at one end of the body portion and which extends radially outwardly beyond the body portion, and a skirt portion which is positioned at a periphery of the masking portion and which extends from a first face of the masking portion and away from the body portion;
   (v) the mandrel has a first portion of a first diameter which locates in the bore, and a second portion which is of a second and smaller diameter than the first diameter and which is for locating the apparatus during the painting;
   (vi) the body portion extends from a second face of the masking portion;
   (vii) there are no supporting buttresses extending between the body portion and the second face of the masking portion, whereby the second face of the masking portion is free from supporting buttresses which would act to provide unwanted masking of areas of parts of the aircraft being painted;
   (viii) the body portion and/or the masking portion are such that they are provided with internal integral reinforcement that prevents the breaking of the masking portion during use of the apparatus, even although there are no supporting buttresses extending between the body portion and the masking portion; and
   (ix) at least a portion of the masking formation is configured to fit inside a channel part of the nut plate and thereby to effect masking in the inside of the channel part of the nut plate.

2. Apparatus according to claim 1 in which the internal integral reinforcement is an integral part of a wall of the body portion and/or an integral part of a wall of the masking formation.

3. Apparatus according to claim 1 in which the body portion is a cylinder.

4. Apparatus according to claim 3 in which the cylinder is circular in cross section.

5. Apparatus according to claim 1 in which the masking portion is a disc.

6. Apparatus according to claim 1 in which the bore is circular in cross section.

7. Apparatus according to claim 1 in which the first and second portions of the mandrel are of circular cross section.

8. Apparatus according to claim 1 in which the rigid plastics material is a thermoplastics material.

9. Apparatus according claim 1 in which the flexible material is rubber.

* * * * *